United States Patent [19]
Akamine et al.

[11] Patent Number: 6,088,025
[45] Date of Patent: Jul. 11, 2000

[54] TERMINAL DEVICE WITH BUILT-IN IMAGE SENSOR

[75] Inventors: Takenori Akamine, Ikoma; Hiroshi Yamamoto, Katano; Kazuhiro Kayashima, Hirakata; Yoshihiro Kojima, Kobe, all of Japan

[73] Assignee: Matsushita Electric Industrial Co., Ltd., Osaka, Japan

[21] Appl. No.: 08/701,083

[22] Filed: Aug. 21, 1996

[30] Foreign Application Priority Data

Aug. 24, 1995 [JP] Japan ................................. 7-215840

[51] Int. Cl.⁷ .................................................. G09G 5/00
[52] U.S. Cl. ...................... 345/175; 345/104; 358/473; 358/474; 382/321
[58] Field of Search ................................. 345/207, 175, 345/104, 156; 358/473, 474; 382/321

[56] References Cited

U.S. PATENT DOCUMENTS

| | | |
|---|---|---|
| 4,275,423 | 6/1981 | Takahashi et al. . |
| 4,949,079 | 8/1990 | Loebner .................................. 345/180 |
| 5,091,747 | 2/1992 | Tsai . |
| 5,159,322 | 10/1992 | Loebner .................................. 345/180 |
| 5,229,869 | 7/1993 | Kikuchi et al. ......................... 358/473 |
| 5,237,651 | 8/1993 | Randall ................................... 395/148 |
| 5,268,687 | 12/1993 | Peled et al. . |
| 5,278,673 | 1/1994 | Scapa et al. ............................ 358/472 |
| 5,327,503 | 7/1994 | Kiyohara ................................. 382/321 |
| 5,392,447 | 2/1995 | Schlack et al. ......................... 345/339 |
| 5,416,610 | 5/1995 | Kikinis ................................... 358/474 |
| 5,457,550 | 10/1995 | Baba et al. .............................. 359/18 |
| 5,724,108 | 3/1998 | Shibata ................................... 349/62 |

FOREIGN PATENT DOCUMENTS

| | | |
|---|---|---|
| 0 393 509 | 10/1990 | European Pat. Off. . |
| 59-229967 | 12/1984 | Japan . |
| 05316301 | 11/1993 | Japan . |
| 07046349 | 2/1995 | Japan . |
| 1429290 | 3/1976 | United Kingdom . |
| 2191303A | 12/1987 | United Kingdom . |
| WO 92/10049 | 6/1992 | WIPO . |

*Primary Examiner*—Dennis-Doon Chow
*Attorney, Agent, or Firm*—Ratner & Prestia

[57] ABSTRACT

The terminal device with built-in image sensor allows to use a conventional writing tool as the handwritten input means, and facilitates reading of printed document, and incorporates a scanning image sensor composed of a lens member having the optical path disposed parallel to a transparent panel, a prism member for bending the optical path at right angle to match one focal position of the lens member with the surface of the transparent panel, a light source for illuminating the surface of the transparent panel, and a light sensor disposed at other focal position of the lens member, and reads a document placed on the transparent panel, and conventional writing device is provided in the lid unit, and by closing the lid unit after writing character or picture by the writing device, the character or picture is read by the image sensor.

21 Claims, 9 Drawing Sheets

POSITION OF A     POSITION OF B

TERMINAL DEVICE WITH BUILT-IN IMAGE SENSOR

BACKGROUND OF THE INVENTION

1. Industrial Field of Utilization

The present invention relates to a terminal device with built-in image sensor as an information appliance to be used in place of a memo pad capable of easily taking in handwritten characters or pictures or documents of printed matter, or the like, in a portable terminal device, personal computer, and the like.

2. Related art of the Invention

Recently, as the information appliances are becoming smaller in size and the information communication technology is extremely advanced, the demand for portable terminal devices is increasing abruptly.

Features of such terminal device include capability of filing of information of large capacity in small size and light weight, provision of handy input means for handwriting instead of a memo pad, and connection with communication line for transmitting and receiving data, among others.

As a result, for example, a businessman does not have to carry a large volume of documents on his business trip, and new information can be transmitted and received by connecting with the communication line from a staying place, and it provides very convenient high functions for business people.

It is hence highly expected to be a business tool in the multimedia age.

At the present, however, there are still many problems.

In particular, the conventional handwritten input means was designed to write characters or pictures directly on the touch panel provided in the front panel of the liquid crystal surface, and it was hard to use as compared with the conventional writing tool.

Besides, when taking in the printed document such as visiting card and map, a scanner or other peripheral device was separately needed.

The problems of the conventional handwritten input means are specifically described. First, to prevent the polyester film on the surface of the touch panel from being damaged, the writing tool is a special plastic pen of high sliding performance, and as compared with the conventional writing tool, it is hard to write character or picture, and when used for a long time, the surface of the touch panel is injured.

Or, when writing characters or pictures by using conventional writing tools such as pen and pencil, by writing while observing the handwriting, pictures and characters can be written as intended, but in the conventional handwritten input means, a limited handwriting is displayed depending on the resolution of the touch panel, the resolution of the liquid crystal, and the thickness of the furnished writing tool, and the writing area (touch panel) and handwriting display area (display unit) are different members, and it is hence hard to enter the characters or pictures exactly as intended.

Still more, when writing characters by conventional writing tools such as pen and pencil, individual and characteristic letters can be written depending on the size of characters or pressure on the pen, but when writing characters on the touch panel of resistance film type, a constant pressure is always required, characters and pictures appear to be similar and inexperienced if written by whoever as compared with the writing by the conventional tool. On the other hand, when taking in printed documents such as visiting card and map, a reading scanner or other device was separately needed.

SUMMARY OF THE INVENTION

To solve the above problems, it is hence an object of the invention to present a terminal device with built-in image sensor capable of reading a document or further a long document, allowing to write input characters and pictures easily, and assuring rigidity while realizing smaller size.

A terminal device with built-in image sensor of the present invention comprises a display unit for displaying information such as character and picture, a transparent panel disposed at the front panel of said display unit, and an image sensor disposed movably between said display unit and said transparent panel, for scanning the surface of said transparent panel, wherein said image sensor comprises a lens member disposed so that the optical path may be substantially parallel to said transparent panel surface, a prism member for bending the optical path so that one focal position of the lens member may be adjusted to the surface of said transparent panel, and that the light coming from the direction of the transparent panel may enter said lens member, a light sensor disposed at other focal position of said lens member, and a light source for irradiating said transparent panel surface with light.

In this constitution, since the members of the image sensor (lens member, prism member, light source, light sensor) are disposed parallel between the transparent panel and display unit, a thin image sensor is realized.

The prism member of this constitution is a transparent material of high refractive index of 1.5 or more, or is such transparent material of high refractive index forming a reflection preventive film on the surface, and hence the optical path folding at right angle by prism member can be substantially extended in length, and the efficiency of the light source can be enhanced. As a result, a sufficient allowance is given to the device design and processing precision, and reading of high picture quality is realized.

A terminal device with built-in image sensor of the present invention is that roller means for moving a document is rotatably provided at one side vertical to the moving direction of the image sensor on the transparent panel surface, said image sensor has a reading width in a specific length to the direction of the vertical side, and can stop at a position corresponding to the position of the roller means, and can read the moving document, being held between the transparent panel and roller means, at its stopping state position.

In this constitution, by moving the image sensor, it is possible to read a document in a size as large as the transparent panel. Moreover, when reading a document longer than the length of the transparent panel, with the image sensor stopped at the position of the roller means, by inserting the document between the roller means and transparent panel and moving that document, a longer document can be read.

A terminal device with built-in image sensor of the present invention comprises a main body incorporating a display unit for displaying information such as character and picture, a transparent panel disposed at the front panel of said display unit, an image sensor disposed movably between said display unit and transparent panel for scanning the surface of said transparent panel, a lid unit substantially having at least the same size as the size of the display unit or substantially having at least the same size as the size of the reading area of the image sensor, and possessing tablet means allowing to write with conventional writing tool such as pencil and marker pen, wherein said lid unit is provided so as to be free to open or close to said main body unit, and the surface of the tablet means contacts with the transparent panel surface in closed state.

In this constitution, in the case of handwritten input, by writing character or picture by conventional writing tool on the tablet means provided in the lid unit, and closing the lid unit into the main body unit, the tablet means is brought in tight contact with the transparent panel surface. At this time, when the image sensor is moved, the character or picture written on the tablet means can be read. Further, by comprising the opening state detecting means for detecting opening or closing of the lid unit, and drive means for starting scanning by the image sensor when closed state of the lid unit is detected by the opening state detecting means, reading starts automatically when the lid unit is closed.

The lid unit is composed of a subsidiary lid member having one end linked to the lower end portion of the main body unit for covering a specific side surface of the main body unit in the closed state, and a principal lid member linked to the other end of the subsidiary lid member for covering the transparent panel surface in the closed state, and therefore in the open state of the lid unit, the outer side surface of the principal lid member abuts against the plane on which the main body unit is mounted, so that the lid unit is stably supported on the plane.

Moreover, when the lid unit is composed of a principal lid member having one end linked to the main body unit for covering the transparent panel surface in the closed state, and a subsidiary lid member linked to the other end of the principal lid member for covering a specific side surface of the main body in the closed state, in the closed state of the lid unit, the display unit of the main body unit and specified side surface, for example, the interface terminal unit are covered by the principal lid member and subsidiary lid member, and in the open state of the lid unit by putting on a desk or flat surface for use (being opened to an angle most suited to handwriting, that is, to about 180 degrees), the subsidiary lid member abuts against the plane, and a stable state can be maintained, preventing the tablet means from being oscillated or inclined.

PREFERRED EMBODIMENTS

Figure 1:
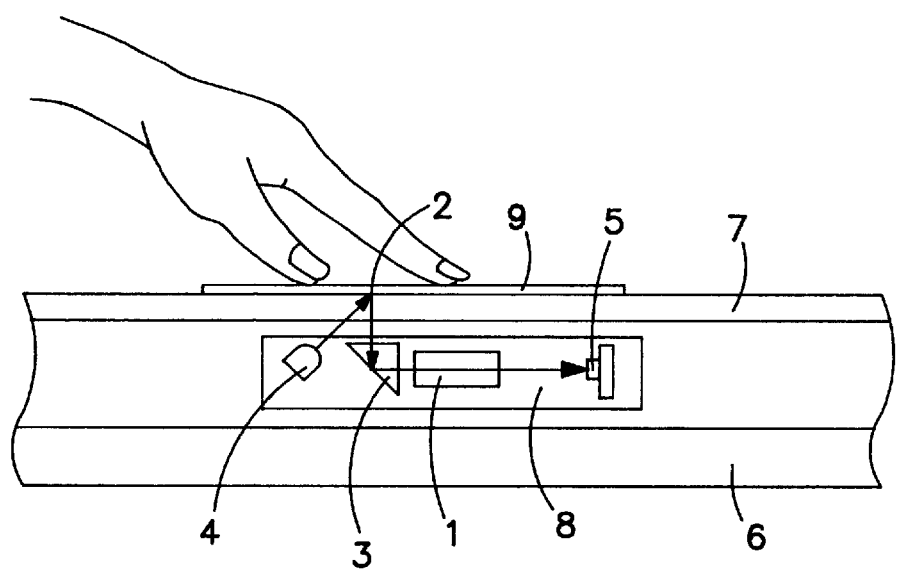
FIG. 1 is a sectional view of an image sensor in an embodiment of the invention.

Referring now to the drawings, embodiments of the invention are described in detail below.

FIG. 1 is a sectional view of an image sensor in an embodiment of the invention. In FIG. 1, an image sensor 8 is provided between a liquid crystal display unit 6 and a transparent panel 7, and moves in a direction parallel to the surface of the transparent panel 7. This image sensor 8 comprises a self-focusing lens 1 which is a lens member disposed parallel to the transparent panel 7, a prism member 3 for adjusting one focal position of the self-focusing lens 1 on a surface 2 of the transparent panel 7 and bending the optical path at right angle, a light source 4 for illuminating the surface 2 of the transparent panel 7, and a light sensor 5 disposed at other focal position of the self-focusing lens 1. That is, the self-focusing lens 1, prism member 3, light source 4, and light sensor 5 are disposed parallel along the surface of the transparent panel 7, between the transparent panel 7 and the liquid crystal display unit 6.

In this constitution, so as to contact with the surface 2 of the transparent panel 7, a written document 9, for example, visiting card or map, is mounted, and by moving the image sensor 8, the information of this document can be read.

Figure 2:
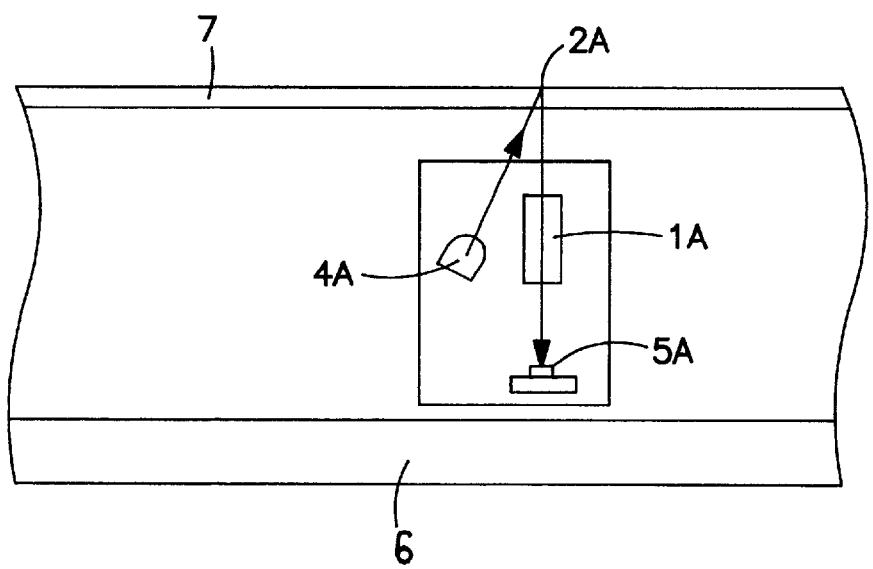
FIG. 2 is a sectional view of an image sensor in prior art.

On the other hand, FIG. 2 shows a conventional example of image sensor disclosed in an embodiment of Japanese Patent Application 6-310392 filed previously, and this constitution is a typical structure employed as sensor in the present facsimile apparatus. This conventional image sensor is composed by disposing a self-focusing lens 1A vertically to the surface of the transparent panel 7, matching one focal position of the self-focusing lens 1A with surface 2A of the transparent panel 7, and matching other focal position with a light sensor 5A. A light source 4A is disposed so as to illuminate the surface 2A of the transparent panel 7. Comparing the embodiment shown in FIG. 1 and the conventional constitution shown in FIG. 2, it is known that an extremely thin image sensor can be realized in the constitution of the embodiment shown in FIG. 1.

Generally, the self-focusing lens has the characteristic of becoming short in the focal length as the lens length becomes shorter (the width shorter), and when desired to design a compact scanner, the space necessary for allowing the scanner to scan smoothly cannot be provided between the transparent panel 7 and image sensor. A general focal length of a self-focusing lens with a short lens length is 3 mm to 5 mm, and at least 3 mm is needed in total of the thickness of the transparent panel 7 considering safety and the distance between the image sensor and transparent panel 7, and it is very difficult to design, and a high processing precision is required at the same time. It also requires an allowance for adjustment in design and processing, but the focal depth is shorter in the self-focusing lens of shorter lens length (a general focal depth is ±0.3 mm), and it is also extremely difficult to design, and the reading picture quality may be poor.

It is hence required to extend the optical length without changing the physical distance of the focal length of the self-focusing lens. In this embodiment, it is intended to extend the optical distance of the focal length by making the prism member 3 of a material of high refractive index.

Figure 3:
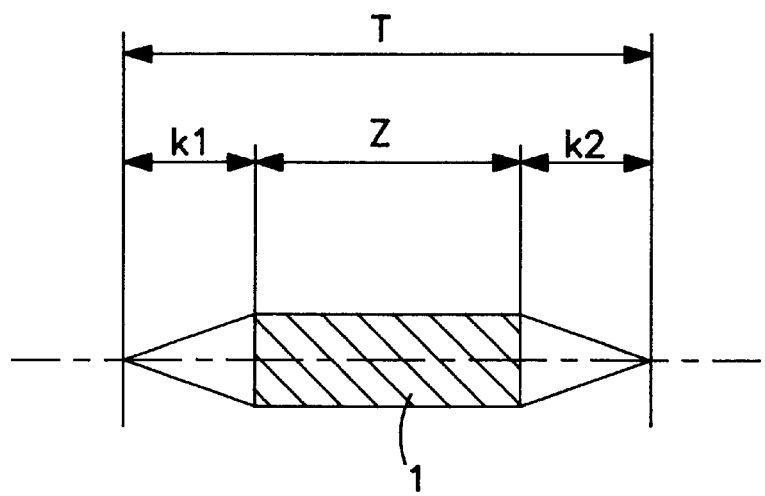
FIG. 3 is a diagram showing a self-focusing lens.

Herein, the method of extending the optical distance k1 of the focal length is explained by reference to FIG. 3, FIG. 4, and FIG. 1. In FIG. 3, symbol T represents the distance between the object and image, Z is the length of the self-focusing lens 1, k1 is one focal length of the self-focusing lens 1, k2 is other focal length of the self-focusing lens 1, and they are related as follows: T=Z+k1+k2.

To obtain a more accurate image, the members must be disposed in the condition of k1=k2.

In this embodiment, however, there is a physical restricting dimension of the minimum required limit, such as the prism member 3 and transparent panel 7 at one focal length k1 side. On the other hand, at the other focal length k2 side, there is no inclusion and the spatial distance is available itself.

To extend the optical distance k1 of the focal length, the self-focusing lens 1 with short k1 and k2 is needed, and hence the material of the prism member 3 is optical glass (refractive index 1.9) or Se glass (refractive index 2.5) of higher refractive index than ordinary glass (refractive index 1.5), and a material optically having a long focal length k1 is used.

More specifically, the difference in the focal length in comparison of ordinary glass and Se glass is explained by reference to FIG. 4.

Figure 4:
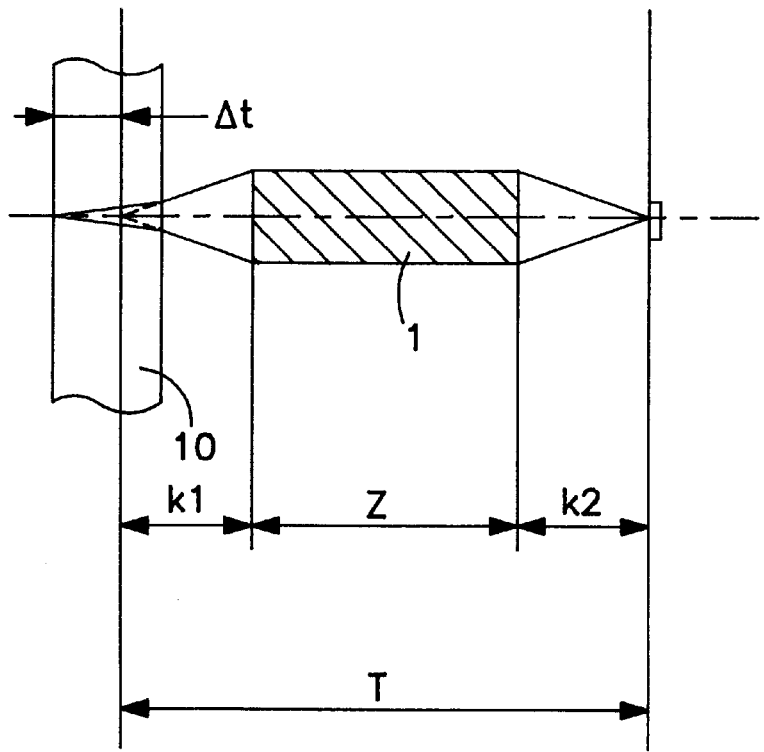
FIG. 4 is a diagram showing a refracted state of the focus of a self-focusing lens by glass.

In FIG. 4, reference numeral 10 is glass, and Δt denotes the increment of focal length due to refractive index. The increment At can be expressed as Δt=t (n−1)/n, where t is mean thickness of prism member (4 mm in this example), and n is the refractive index.

Therefore, in the case of ordinary glass, the increment isΔt=1.33, and in the case of Se glass, the increment Δt =2.33.

That is, by using a material of high refractive index for the prism member, as compared with the ordinary glass, the increment of k1 is about 1 mm (2.33 mm=1.33 mm).

As a result, an allowance of about 1 mm is provided for design and processing, and the focal adjustment is easier, so that productivity and reading performance may be enhanced.

Furthermore, in this embodiment, when changes of contrast of the document due to the light illuminated from the light source 4, that is, when changes of quantity of light enter the prism, they are reflected by the prism surface and the quantity of light is attenuated. To prevent this, a reflection preventive film is formed on the surface of the prism member 3, and the efficiency of the light source 4 is enhanced.

Figure 5:
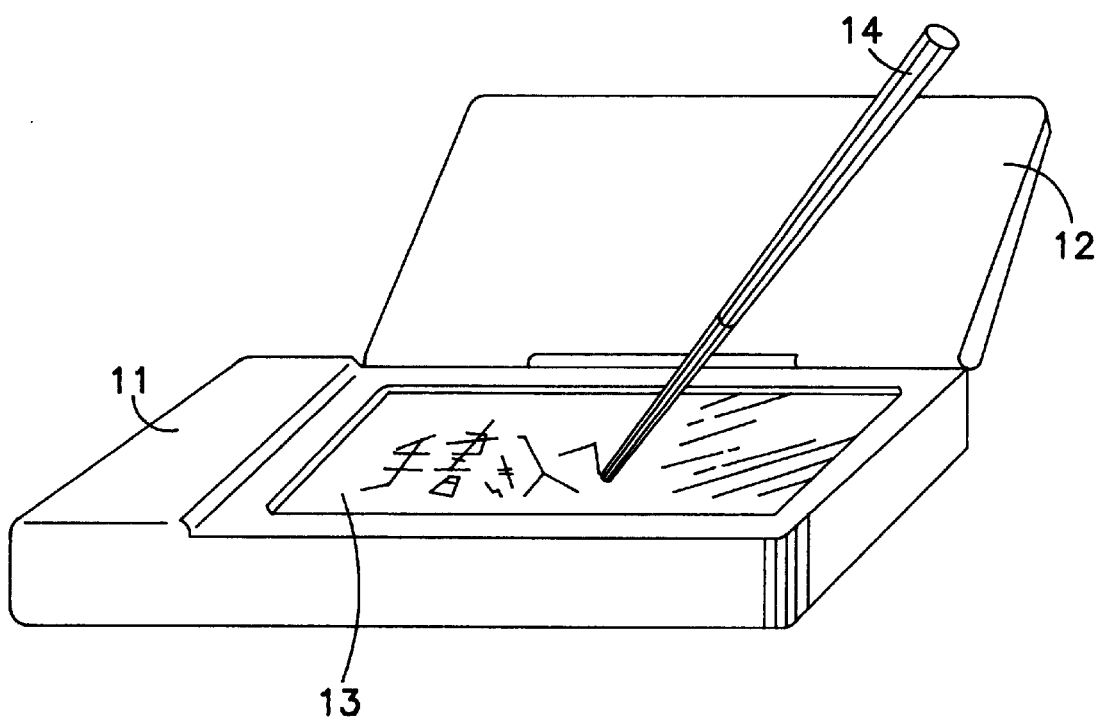
FIG. 5 is a diagram showing a conventional portable terminal device.

FIG. 5 shown a conventional portable terminal device, in which reference numeral 11 is a main body, 12 is a lid provided to open and close freely, and 13 is a liquid crystal display unit, and a touch panel of resistance film type is composed on the surface of the display unit 13. Reference numeral 14 is a special pen.

When writing character or picture, using the pen special 14 made of plastics of high sliding performance or the like, it is designed to enter by handwriting by directly writing on the surface of the display unit 13.

Figure 6:
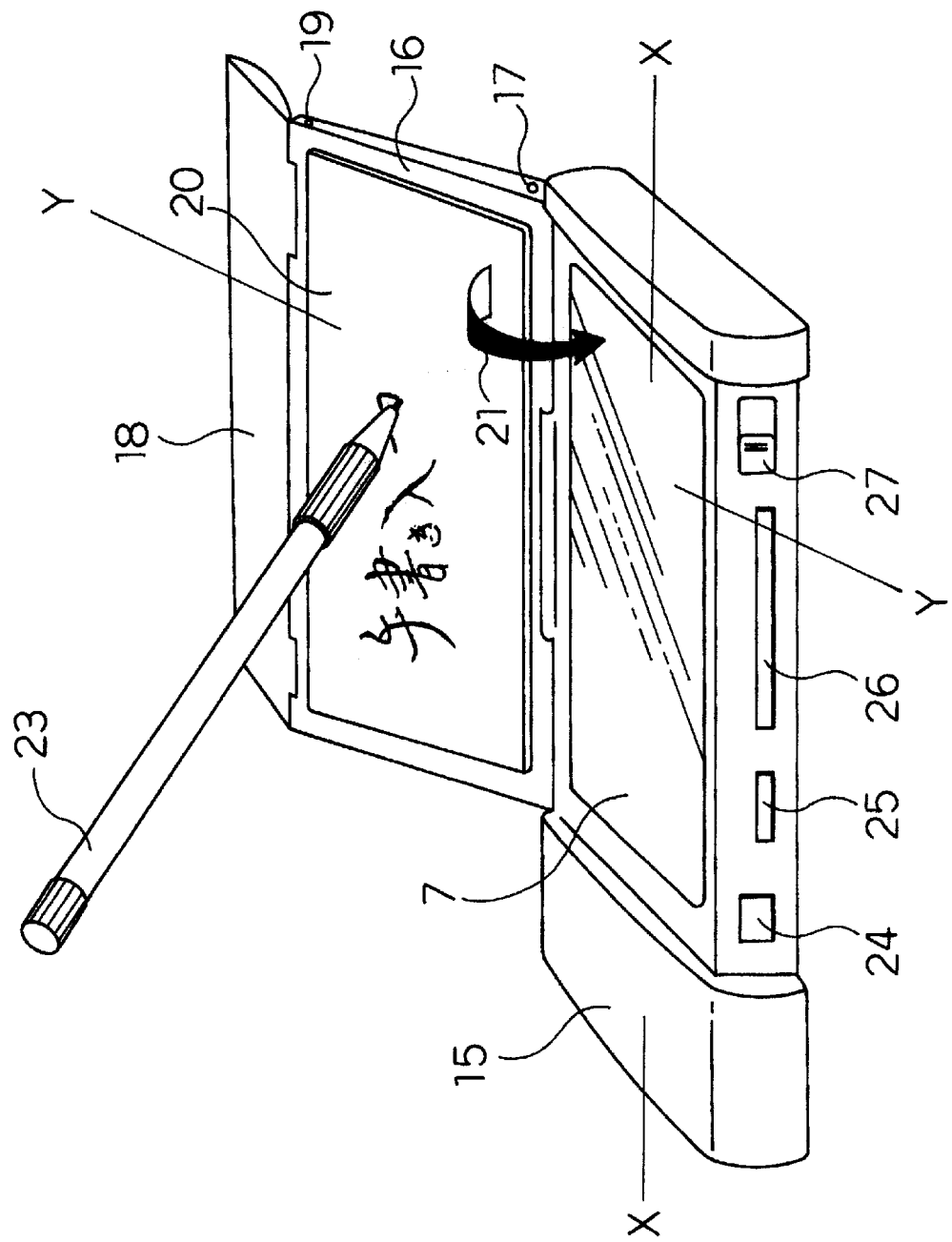
FIG. 6 is an outline diagram of open state of the lid of a portable terminal device with built-in image sensor in an embodiment of the invention.

FIG. 6 is a diagram showing a portable terminal device in an embodiment of the invention, in which reference numeral 15 is a main body unit, and a lid unit 16 is linked to the main body unit 15 by hinge means 17 so as to be free to open and close. At the leading end of the lid unit 16, a small lid 18 is coupled rotatably through a hinge 19.

Tablet means 20 is provided in the lid unit 16, and by closing the lid unit 16 in the direction of arrow 21, the surface of the tablet unit 20 contacts with the surface of the transparent panel 7 of the main body unit 15. The surface of the tablet means 20 is composed of a white board so that characters and pictures can be written or erased easily by a general water-based marker pen 23.

At the front side of the main body unit 15, there is an operation unit comprising, for example, a modular terminal 24 for facsimile apparatus, an RS232C terminal 25, a card slot 26, and a power switch 27.

Figure 7:
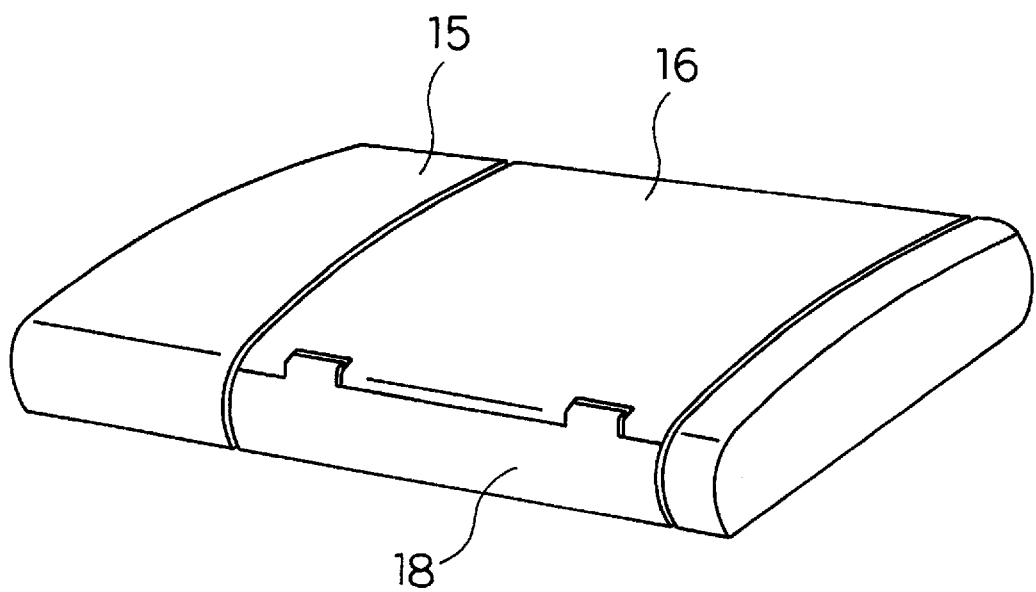
FIG. 7 is an outline diagram of closed state of the lid of the portable terminal device of FIG. 6.

FIG. 7 shows a closed state of the lid unit 16, in which the lid unit 16 covers the transparent panel 7, and the small lid 18 covers the operation unit.

Figure 8:
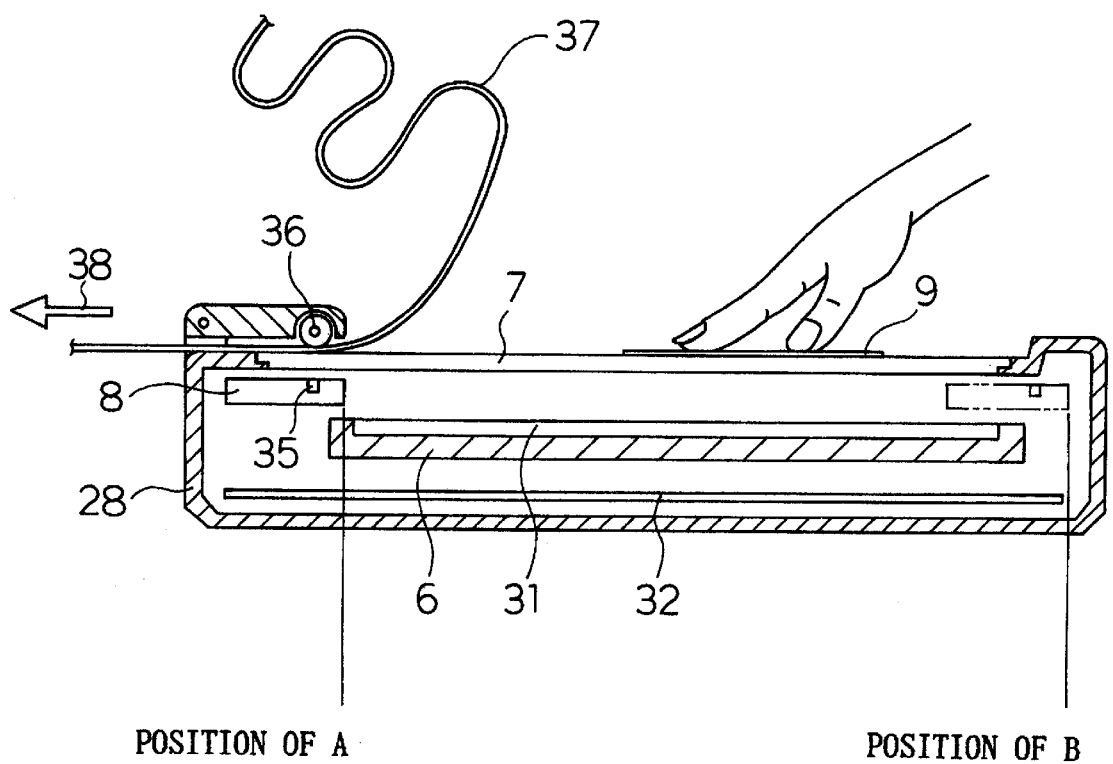
FIG. 8 is a sectional view of X—X in FIG. 6.

FIG. 8 is a sectional view of X—X in FIG. 6. In FIG. 8, reference numeral 28 is a main body case, and a liquid crystal display unit 6, an image sensor 8, and an electric circuit board 32 are provided inside this main body 28, and a transparent panel 7 is provided in the upper part. A display unit 31 of the liquid crystal display unit 6 is composed to be visible in the entire region through the transparent panel 7.

The image sensor 8 provided between the transparent panel 7 and liquid crystal display unit 6 moves from the position of one end A of the transparent panel 7 to the position of other end B, and reads the document 9, such as visiting card or map, placed on the surface of the transparent panel 7 in this moving process.

Herein, the image sensor 8 is a line image sensor, and the reading length on the subsidiary scanning direction is at least longer than the length of one side of the transparent panel 7 and display unit 31, so that the all area of the transparent panel 7 can be read. The drive means of this image sensor 8 is composed so that the image sensor 8 can move on the guide shaft by the driving force of a stepping motor, and this mechanism is a general structure, and the description of the mechanism is omitted.

A reading position 35 of the image sensor 8 is constituted so as to be located outside of the display area of the display unit 31, in a state of stopping at position of A (home position), and a roller member 36 is rotatably provided on the surface of the transparent panel 7 corresponding to the reading position 35, and it is allowed to insert a long document 37 between the roller member 36 and transparent panel 7, and move the long document 37 in the direction of arrow 38.

In such constitution, by inserting a long document 37 between the roller member 36 and transparent panel 7, and pulling and moving the long document 37 in the direction of arrow 38, the characters and pictures printed on the long document 37 can be read.

To prevent uneven reading depending on changes of moving speed of the long document 37, in this embodiment, the roller member 36 is provided with an encoder as means for detecting the angle of rotation, and it is designed to process data while detecting the moving speed of the document. In this case, as the means for detecting the angle of rotation, other means than encoder may be also used.

Figure 9:
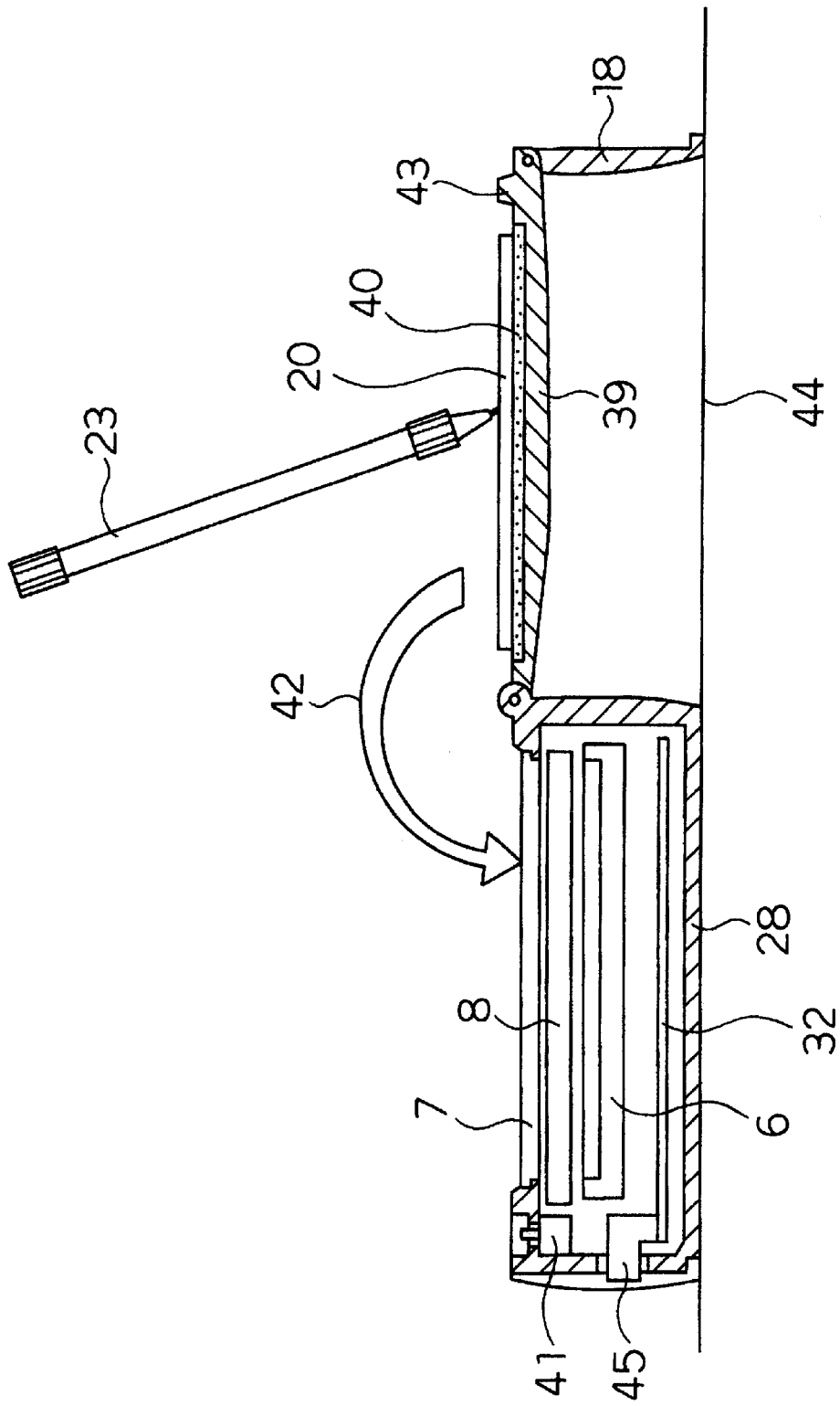
FIG. 9 is a sectional view of Y—Y in FIG. 6.

FIG. 9 is a sectional view in the Y—Y direction in FIG. 6, and a lid case 39 is furnished with tablet means 20 through an elastic member 40 formed of elastic material such as foamed urethane. In this embodiment, the material of the tablet means 20 is a white board which can be easily written or erased by a water-based marker pen 23.

The main body case 28 comprises a detection switch 41 as opening state detecting means for starting the drive means of the image sensor 8 in the closed state of the lid case 39.

In such constitution, after writing characters or pictures in the tablet means 20, by closing the lid case 39 in the direction of arrow 42, the tablet means 20 contacts with the transparent panel 7, and a protrusion 43 of the lid case 39 presses the detection switch 41. As a result, the drive means is started, and moving and reading of the image sensor 8 will be started.

A small lid 18 abuts against a plane 44 such as desk at its leading end in the state as shown in FIG. 9, and it works to keep horizontal the tablet means 20 when writing characters. Reference numeral 45 indicates terminals mounted on the electric circuit board 32.

Figure 10:
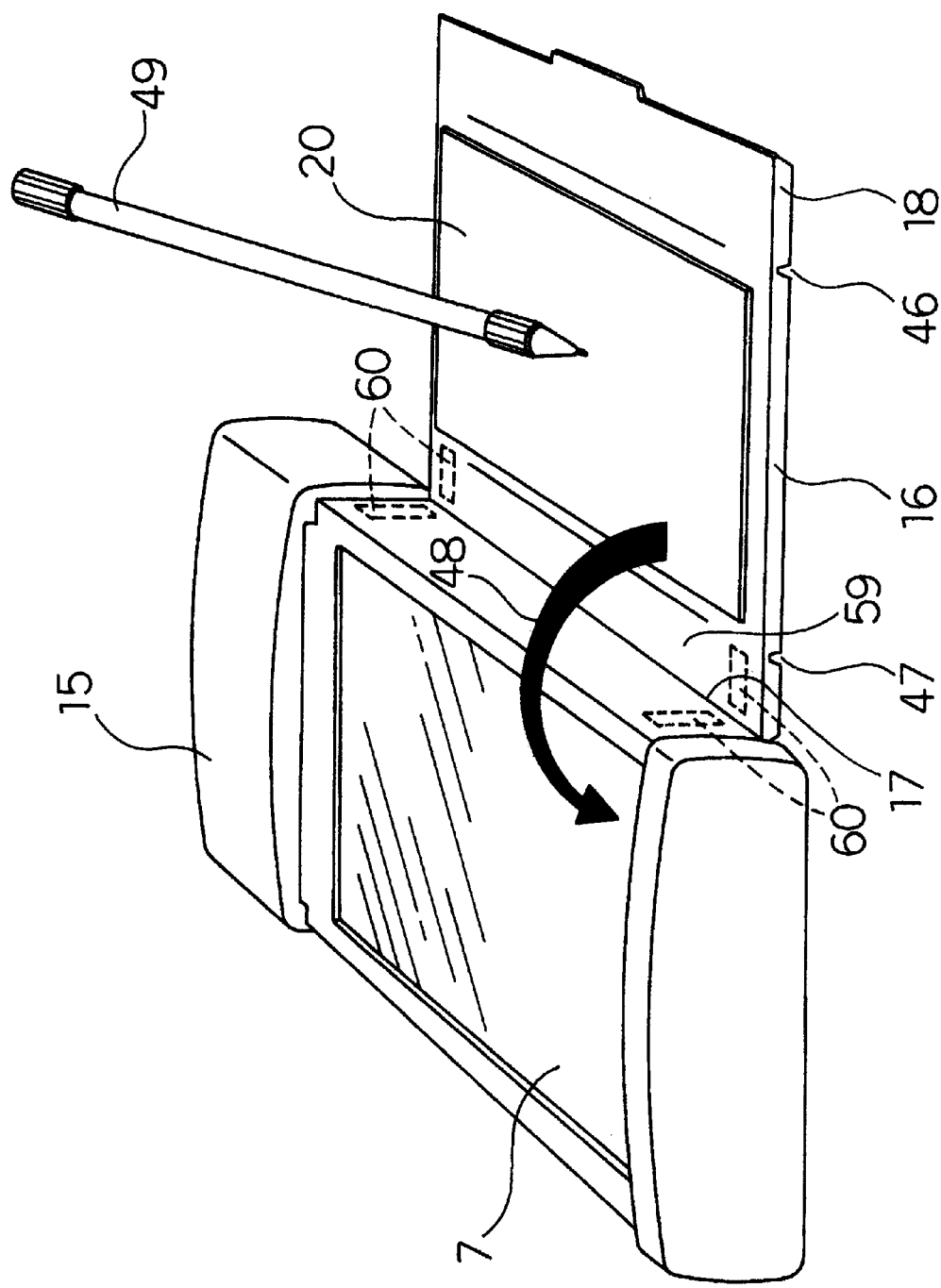
FIG. 10 is an outline diagram of a portable terminal device with built-in image sensor in other embodiment of the invention.

Other embodiment of the invention is described below. FIG. 10 shows a different embodiment relating to main body unit 15 and tablet means 20, showing an open state of lid unit 16. At the leading end of the lid unit 16, a small lid 18 is flexibly formed by a notch A 46. Furthermore, the lid unit 16 is linked to a small lid 59 which is a subsidiary lid member, flexibly by a notch B 47. The small lid 59 is rotatably hinge coupled with the lower end of the main body unit 15 through hinge means 17, and the lid unit 16 is formed flexibly in the direction of arrow 48 by the notch B 47.

Therefore, as shown in FIG. 10, with the lid unit 16 being open, the back side of the lid unit 16 opens until reaching the plane such as desk, and characters and pictures are written by writing tool 49 in this state. When the lid unit 16 is closed in the direction of arrow 48, as shown in FIG. 7, it is designed so that the small lid 18 may cover the interface terminals provided on the side of the main body unit 15. Besides, as indicated by dotted line in FIG. 10, at both ends of the small lid 59, fixing members 60 such as magnets and "one-touch chucks" are provided, and the small lid 59 is fixed to the main body unit 15, and the lid unit 16 may be closed securely. Herein, it is designed to open the lid unit 16 to the inner side, and the interface terminals are provided at the side free from the hinge means 17, but otherwise the lid unit 16 may be opened to the outer side and the terminals may be provided at the mounting side of the hinge means 17.

Figure 11:
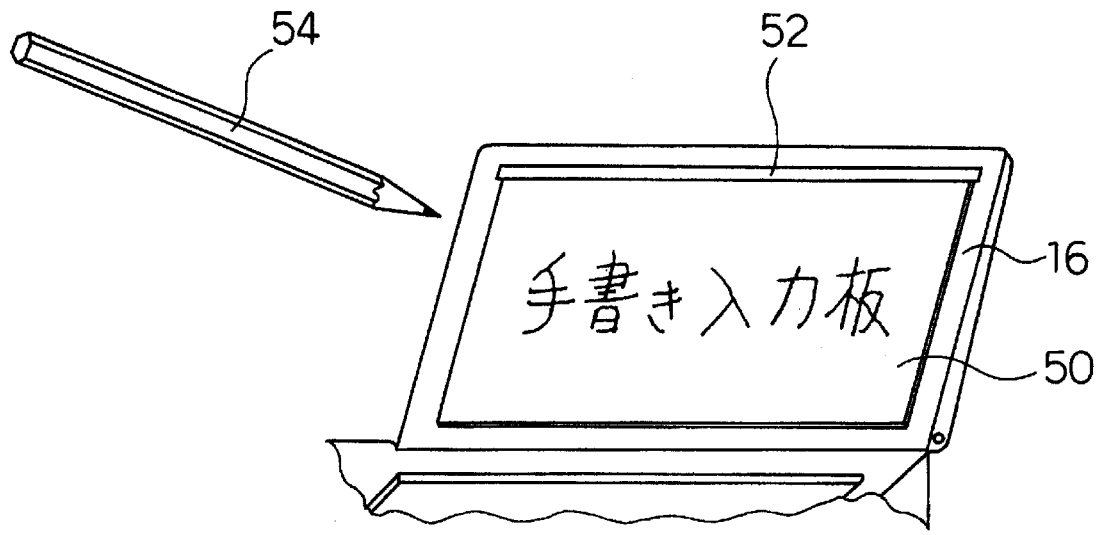
FIG. 11 is a diagram showing tablet means in a different embodiment of the invention.
Figure 12:
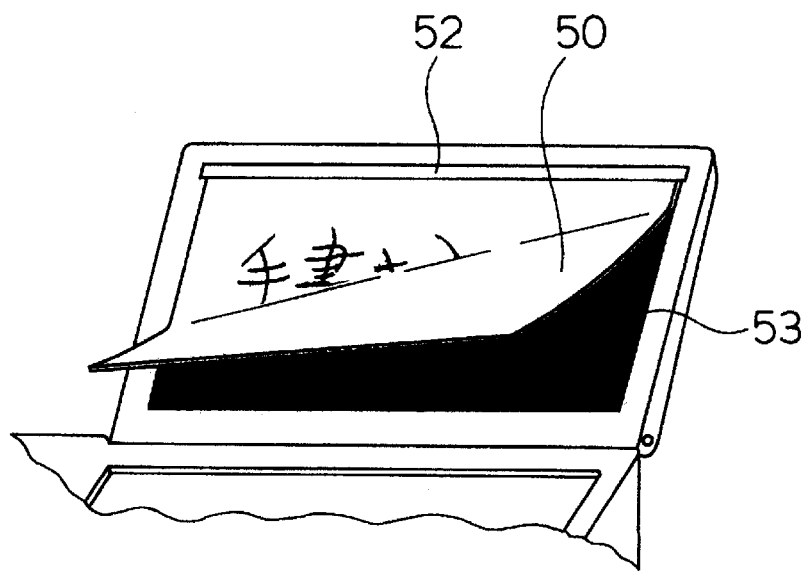
FIG. 12 is a diagram showing a method of erasing character in FIG. 11.

FIG. 11 and FIG. 12 show other embodiment of the tablet means 20, and only the lid unit 16 is shown. In this embodiment, it is intended to erase easily the characters and pictures written in the tablet means 20. In the writing area of the lid unit 16, a writing film 50 formed of a white polyester film is fixed at one side by a detachable film holder 52. A black metal plate 53 is provided between the writing film 50 and lid case.

At the back side of the writing film 50, a tacky layer with a very weak cohesion is formed, and by writing a character or a picture on the surface of the writing film 50 by pencil. 54 or other hard writing tool, the black color of the metal plate 53 is transmitted to the surface of the writing film 50 according to the handwriting.

To erase the written character or picture, as shown in FIG. 12, only by peeling off the writing film 50 from the metal plate 53, the transmitted character or picture can be easily erased. In this embodiment, since the polyester film is used in the writing area, the surface of the writing film 50 may be damaged or stained in a long time of use. In such a case, it can be replaced with a new writing film by detaching the film holder 52. Moreover, by using paper instead of the writing film 50, not only handwritten character or picture, but also graphs using compass and rule can be written on the paper.

The foregoing embodiments relate to the portable terminal device, but it is also possibly to apply in non-portable terminal devices such as desktop personal computers and word processors.

Also in the embodiments, the lid unit is linked to the main body unit at one end, but, alternatively, the lid unit may be detached from the main body unit.

In the above embodiments, nothing is written preliminarily in the entry area of the tablet means, but not limited to this, for example, a printed format paper such as trade slip and facsimile transmission form may be set in the entry area, and only necessary columns may be filled so that the slip or facsimile letter may be compiled easily.

As described herein, in the method of reading a document placed on a transparent panel by scanning between the liquid crystal display unit and transparent panel by means of the image sensor, the invention is characterized by disposing principal constituent elements of the image sensor (self-focusing lens, prism, light source, light sensor) parallel along the transparent panel surface between the. transparent panel and the liquid crystal display unit, and thereby an extremely thin image sensor is realized, and a material of high refractive index is used for the prism member, and a reflection preventive film is formed on the surface thereof.

As a result, designing and processing are facilitated, focal adjustment is easy, and the efficiency of light source is enhanced, and therefore the productivity and reading performance are improved.

By thus realizing the image sensor of small size, light weight, and high efficiency, the following completely new and convenient portable terminal device is realized. In particular, the invention is intended to solve many problems of the character input means of the conventional portable terminal device mentioned herein, and first of all it is extremely easy to read a printed document. For example, when reading a small document such as visiting card or map, it can be read only by putting the document on the transparent panel, and when reading a document longer than the transparent panel of the device such as trade slip or receipt, the document is inserted between the transparent panel and roller member, and the document is moved and is read.

In the conventional handwritten input means, the character or picture was directly entered into the touch panel disposed on the front panel of the display unit by handwriting, whereas the invention has the tablet means for handwritten input disposed in the lid unit. Therefore, as the writing tool, the conventional writing tool such as pencil and marker pen can be used, and the material for the writing surface may be white board, paper, or other conventional writing material.

Therefore, as compared with the conventional method, the surface of the display unit is not damaged or stained, and the handwriting is visible when entering, so that a fine illustration or curve can be smoothly written in. Besides, since the writing pressure is not limited, it is also possible to enter characters by brush or write by individual penmanship.

In the invention, moreover, since the liquid crystal unit, terminal unit and power switch are covered by the principal lid member and subsidiary lid member, when the device is carried in a bag or pocket, breakage of the operation unit and terminal unit or malfunction may be prevented, so that a rigid device may be realized.

When entering characters, the subsidiary lid member works to keep horizontal the entry surface, or the entry surface is kept horizontal on a plane such as desk, so that the use can used in the same feeling as when writing with a notebook or memo pad at the time of input.

Still more, by setting a printed format paper such as trade slip and facsimile transmission form in the entry area, and filling in only necessary columns, the slip or facsimile letter may be compiled easily, and in such manner by employing the invention, as compared with the conventional portable terminal device, a portable terminal device or electronic notebook extremely effective as business tool is realized.

What is claimed is:

1. A terminal device with built-in image sensor comprising a display unit for displaying information including at least one of character and picture, a transparent panel disposed at the front panel of said display unit, and an image sensor disposed movably between said display unit and said transparent panel, for scanning the surface of said transparent panel, wherein said image sensor comprises a lens member, a prism member for bending an optical path of a light coming from a direction of the transparent panel so that one focal position of the lens member may be adjusted to the surface of said transparent panel, and that the light coming from the direction of the transparent panel may enter said lens member, a light sensor disposed at other focal position of said lens member, said prism member made of a transparent material for lengthening the optical path to the image sensor, a light source for irradiating said transparent panel surface with light, and wherein said prism memeber, lens member and light sensor are arranged so that an optical path from said prism member to said light sensor is substantially parallel to said transparent panel surface.

2. A terminal device with built-in image sensor of claim 1, wherein said prism member is a transparent material of which refractive index is 1.5 or more.

3. A terminal device with built-in image sensor of claim 2, wherein the transparent material has a reflection preventive film formed on its surface.

4. A terminal device with built-in image sensor of claim 1, wherein roller means for moving a document is rotatably provided at one side vertical to the moving direction of the image sensor on the transparent panel surface, said image sensor has a reading width in a specific length to the direction of the vertical side, and can stop at a position corresponding to the position of the roller means, and can read the moving document, being held between the transparent panel and roller means, at its stopping state position.

5. A terminal device with built-in image sensor of claim 4, wherein move detecting means is provided for detecting move of the document inserted between the transparent panel and roller means, and reading of the document is started when move of the document is detected.

6. The terminal device of claim 1 wherein said optical path from said prism member to said light sensor is fixed with respect to said transparent panel.

7. A terminal device with built-in image sensor comprising a main body incorporating a display unit for displaying information including at least one of character and picture, a transparent panel disposed at the front panel of said display unit, an image sensor disposed movably between said display unit and transparent panel for scanning the surface of said transparent panel, a lid unit substantially having at least the same size as the size of the display unit or substantially having at least the same size as the size of the reading area of the image sensor, and having tablet means disposed on said lid unit for writing with a writing tool including at least one of pencil and marker pen on a surface of the tablet means, wherein said lid unit is provided so as to be free to open or close to said main body unit, the surface of the tablet means is in contact with the transparent panel in a closed state, and said lid unit is mounted so that the surface of the tablet means coincides with the reading area of the image sensor.

8. A terminal device with built-in image sensor of claim 7, wherein said lid unit possesses a subsidiary lid member having its one end linked to the lower end of said main body unit, and covering a specific side surface of the main body unit in closed state, and a principal lid member linked to the other end of the subsidiary lid member, and covering the transparent panel surface in closed state, and by putting the main body unit on a plane, in the open state of the lid unit, when the outer side of the principal lid member abuts against the plane, the lid unit is held stably on the plane.

9. A terminal device with built-in image sensor of claim 8, wherein the vicinity of both ends of the subsidiary lid member and the portion of the main body unit corresponding to said vicinity of both ends are provided with fixing members for securely fixing the main body unit and subsidiary lid member in the closed state of the lid unit.

10. A terminal device with built-in image sensor of claim 8, wherein other subsidiary member for covering other side surface than said specific side surface of the main body unit is linked to the opposite end to the subsidiary lid member of the principal lid member.

11. A terminal device with built-in image sensor of claim 8, wherein the operation unit of the terminal device main body is provided in said specific side surface of the main body unit.

12. A terminal device with built-in image sensor of claim 7, wherein said lid unit possesses a principal lid member having one end linked to said main body unit, and covering the transparent panel surface in the closed state, and a subsidiary lid member linked to the other end of the principal lid member, and covering a specific side surface of the main body unit, and by putting the main body unit on a plane, in the open state of the lid unit, when the leading end of the subsidiary lid member abuts against the plane, the opening angle of the principal lid member to the transparent panel surface is defined.

13. A terminal device with built-in image sensor of claim 12, wherein the operation unit of the terminal device main body is provided in said specific side surface of the main body unit.

14. A terminal device with built-in image sensor of claim 7, wherein the tablet means is attached to the lid unit through an elastic member so that the tablet means and the transparent panel may contact with each other on the whole surface when the lid unit is closed.

15. A terminal device with built-in image sensor of claim 7, wherein at least the portion of forming the tablet means of the lid unit is a light shielding member.

16. An image sensor for scanning a surface of a transparent panel comprising:
   a lens member disposed so that an optical path of the lens member may be substantially parallel to said transparent panel surface,
   a prism member for bending an optical path of a light coming from a direction of the transparent panel so that one focal position of the lens member may be adjusted to the surface of said transparent panel, and that the light coming from the direction of the transparent panel may enter said lens member,
   a light sensor disposed at an other focal position of said lens member,
   said prism member made of a transparent material for lengthening the optical path to the image sensor,
   a light source for irradiating said transparent panel surface with light, and
   wherein said prism member, lens member and light sensor are arranged so that an optical path from said prism member to said light sensor is substantially parallel to said transparent panel surface.

17. An image sensor of claim 16, wherein
   said prism member is a transparent material of which refractive index is 1.5 or more.

18. The image sensor of claim 16 wherein said image sensor is disposed movably along said surface of said transparent panel, and said optical path from said prism member to said light sensor is fixed with respect to said transparent panel.

19. A terminal device with a built-in image sensor comprising
   a display unit for displaying information,
   a transparent panel disposed at a front of said display unit,
   an image sensor disposed movably between said display unit and said transparent panel for scanning the surface of said transparent panel,
   said image sensor comprising a lens member disposed so that the optical path may be substantially parallel to said transparent panel surface, a prism member for bending the optical path so that a focal position of said lens member may be adjusted to the surface of said transparent panel and allow light coming from the direction of the transparent panel to enter said lens member, a light sensor disposed at an other focal position of said lens member, and a light source for irradiating said transparent panel surface with light, and
   roller means for moving a document, said roller means rotatably provided at one side vertical to the moving direction of the image sensor on the transparent panel surface,
   wherein said image sensor can stop at a position corresponding to the position of the roller means, and can read the moving document held between the transparent panel and roller means, and
   wherein said roller means possess rotation angle detecting means for detecting the angle of rotation of the roller, and said image sensor can read the document depending on the detected angle of rotation.

20. A terminal device with built-in image sensor comprising
   a display unit for displaying information,
   a transparent panel disposed at a front of said display unit,
   image sensor disposed movably between said display unit and said transparent panel for scanning the surface of said transparent panel,
   said image sensor comprising a lens member disposed so that the optical path may be substantially parallel to said transparent panel surface, a prism member for bending the optical path so that a focal position of said lens member may be adjusted to the surface of said transparent panel and allow light coming from the direction of the transparent panel to enter said lens member, a light sensor disposed at an other focal position of said lens member, and a light source for irradiating said transparent panel surface with light,
   a lid unit having at least substantially the same dimension as that of the display unit or reading area of said image sensor,
   opening state detecting means for detecting opening and closing states of the lid unit, and
   drive means for start of scanning by the image sensor when the closed state of the lid unit is detected.

21. A terminal device with built-in image sensor comprising
   a main body incorporating a display unit for displaying information,
   a transparent panel disposed at a front of said display unit,
   an image sensor disposed movably between said display unit and transparent panel for scanning the surface of said transparent panel,
   a lid unit having at least the same size dimension as that of the display unit and having tablet means for writing with a writing tool,
   said lid unit provided so as to be free to open and close with respect to said main body, and having a surface on the tablet means contacting the transparent panel surface in a closed state,
   state detecting means for detecting open and closed states of the lid unit, and
   drive means for start of scanning by the image sensor when the closed state of the lid unit is detected.

* * * * *

UNITED STATES PATENT AND TRADE MARK OFFICE
CERTIFICATE OF CORRECTION

PATENT NO. : 6,088,025
DATED : July 11, 2000
INVENTOR(S) : Akamine et al.

It is certified that error appears in the above-identified patent and that said Letters Patent is hereby corrected as shown below:

Cover page, insert --[*] Notice: This patent issued on a continued prosecution application filed under 37 CFR 1.53(d), and is subject to the twenty year patent term provisions of 35 U.S.C. 154(a)(2).--

Column 9, lines 2-3, after "comprising" insert --:--

Column 9, line 23, delete "memeber" and insert --member--.

Column 12, line 13, before "image" insert --an--.

Signed and Sealed this

First Day of May, 2001

Attest:

NICHOLAS P. GODICI

*Attesting Officer*  *Acting Director of the United States Patent and Trademark Office*